(12) United States Patent
Yun et al.

(10) Patent No.: US 11,362,434 B2
(45) Date of Patent: Jun. 14, 2022

(54) ELECTRONIC DEVICE INCLUDING ANTENNA

(71) Applicant: Samsung Electronics Co., Ltd., Suwon-si (KR)

(72) Inventors: Su Min Yun, Suwon-si (KR); Myung Hun Jeong, Suwon-si (KR); Je Hun Jong, Suwon-si (KR); Jae Hoon Jo, Suwon-si (KR); Se Hyun Park, Suwon-si (KR); Jae Bong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 16/765,331

(22) PCT Filed: Nov. 15, 2018

(86) PCT No.: PCT/KR2018/013983
§ 371 (c)(1),
(2) Date: May 19, 2020

(87) PCT Pub. No.: WO2019/103398
PCT Pub. Date: May 31, 2019

(65) Prior Publication Data
US 2020/0358202 A1    Nov. 12, 2020

(30) Foreign Application Priority Data

Nov. 24, 2017 (KR) .......................... 10-2017-0158341

(51) Int. Cl.
*H01Q 21/00* (2006.01)
*H01Q 19/17* (2006.01)
(Continued)

(52) U.S. Cl.
CPC ......... *H01Q 19/175* (2013.01); *H01Q 9/0407* (2013.01); *H01Q 9/16* (2013.01);
(Continued)

(58) Field of Classification Search
CPC ...... H01Q 19/175; H01Q 9/0407; H01Q 9/16; H01Q 21/06; H01Q 1/2266; H01Q 1/243
See application file for complete search history.

(56) References Cited

U.S. PATENT DOCUMENTS 6,031,731 A    2/2000   Suesada et al.
6,339,407 B1   1/2002   Gabriel et al.
(Continued)

FOREIGN PATENT DOCUMENTS

CN    101561699 A    10/2009
EP    3125365 A1     2/2017
(Continued)

OTHER PUBLICATIONS

Korean Office Action dated Sep. 14, 2021, issued in a counterpart Korean Application No. 10-2017-0158341.
(Continued)

*Primary Examiner* — Joseph J Lauture
(74) *Attorney, Agent, or Firm* — Jefferson IP Law, LLP

(57) ABSTRACT

According to various embodiments of the present invention, disclosed is an electronic device comprising: a housing that comprises a front surface, a back surface opposite the front surface, and side surfaces surrounding a space between the front surface and the back surface and made of a metal material; at least one antenna array disposed within the housing so as to radiate a millimeter wave signal toward the inside of the electronic device; a wireless communication circuit electrically connected to the at least one antenna array and configured to communicate by using the millimeter wave signal; and a reflecting member arranged such that
(Continued)

the millimeter wave signal radiated from the at least one antenna array is reflected toward the outside of the electronic device. In addition, various embodiments known from the specification are possible.

15 Claims, 18 Drawing Sheets

(51) Int. Cl.
*H01Q 9/04* (2006.01)
*H01Q 9/16* (2006.01)
*H01Q 21/06* (2006.01)
H01Q 1/22 (2006.01)
H01Q 1/24 (2006.01)

(52) U.S. Cl.
CPC ........... *H01Q 21/06* (2013.01); *H01Q 1/2266* (2013.01); *H01Q 1/243* (2013.01)

(56) References Cited

U.S. PATENT DOCUMENTS

| | | | |
|---|---|---|---|
| 7,804,453 B2 | 9/2010 | Chiang et al. | |
| 8,054,232 B2 | 11/2011 | Chiang et al. | |
| 8,138,977 B2 | 3/2012 | Zhang et al. | |
| 8,284,102 B2* | 10/2012 | Hayes | H01Q 25/00 342/374 |
| 9,667,290 B2* | 5/2017 | Ouyang | H01Q 21/065 |
| 10,084,490 B2 | 9/2018 | Ouyang et al. | |
| 10,116,065 B2 | 10/2018 | Pan | |
| 10,218,396 B2 | 2/2019 | Son et al. | |
| 10,297,900 B2 | 5/2019 | Lee et al. | |
| 10,418,687 B2 | 9/2019 | Mow et al. | |
| 10,594,344 B2 | 3/2020 | Son et al. | |
| 10,680,663 B2 | 6/2020 | Ouyang et al. | |
| 11,018,706 B2 | 5/2021 | Son et al. | |
| 2007/0120745 A1* | 5/2007 | Qi | H01Q 21/29 343/702 |
| 2008/0169994 A1 | 7/2008 | Hasegawa | |
| 2009/0040115 A1 | 2/2009 | Zhang et al. | |
| 2012/0154238 A1* | 6/2012 | Carpentier | H01Q 21/0093 343/836 |
| 2012/0235881 A1 | 9/2012 | Pan et al. | |
| 2014/0071018 A1 | 3/2014 | Pan | |
| 2016/0308563 A1 | 10/2016 | Ouyang et al. | |
| 2017/0294705 A1 | 10/2017 | Khripkov et al. | |
| 2017/0309991 A1 | 10/2017 | Noori et al. | |
| 2018/0233815 A1 | 8/2018 | Deng | |
| 2019/0273308 A1 | 9/2019 | Lee et al. | |
| 2020/0014095 A1 | 1/2020 | Mow et al. | |
| 2020/0295789 A1 | 9/2020 | Ouyang et al. | |

FOREIGN PATENT DOCUMENTS

| | | |
|---|---|---|
| JP | H11-031909 A | 2/1999 |
| JP | 3212835 U | 10/2017 |
| KR | 10-2001-0042251 A | 5/2001 |
| KR | 10-2010-0049643 A | 5/2010 |
| KR | 10-2013-0122688 A | 11/2013 |
| KR | 10-2017-0073964 A | 6/2017 |
| KR | 10-2017-0082799 A | 7/2017 |
| KR | 10-2017-0116558 A | 10/2017 |
| WO | 2016/081515 A1 | 5/2016 |

OTHER PUBLICATIONS

Indian Office Action dated Nov. 8, 2021, issued in a counterpart an Indian Application No. 202017022081.
Chinese Office Action dated Sep. 27, 2020, issued in Chinese Application No. 201880074948.8.

* cited by examiner

ELECTRONIC DEVICE INCLUDING ANTENNA

TECHNICAL FIELD

Embodiments disclosed in this specification relate to an electronic device including an antenna.

BACKGROUND ART

With the development of information technology (IT), various types of electronic devices such as a smartphone, a tablet personal computer (PC), and the like are being widely supplied. An electronic device may communicate with any other electronic device or a base station by using an antenna.

Nowadays, as the network traffic of the mobile device sharply increases, a 5th generation (5G) mobile communication technology using a signal in an ultra-high frequency band is being developed. In the case where the signal in the ultra-high frequency band is used, a wavelength of the signal may become shorter, and thus, the miniaturization of the antenna may be easy. Also, because the bandwidth may be used more widely, a significant amount of information may be transmitted or received.

DISCLOSURE

Technical Problem

Because a signal in the ultra-high frequency band has strong straightness, it may not be easy to cover a communication area in all directions with a single antenna module. Accordingly, there may be an antenna module responsible for communication in the directions of the front and back surfaces of an electronic device and an antenna module responsible for communication in the direction of the side surface of the electronic device.

In the meantime, a metal frame has been recently applied to the housing of the electronic device, especially the side surface, depending on a design trend. The metal frame may be understood as part of the housing is implemented with a metallic material. An antenna module responsible for communication in the area of a side surface by using a signal in an ultra-high frequency band may be disposed inside the electronic device, to which the metal frame is applied.

Because the signal in the high frequency band has strong straightness, when the metal frame is positioned on the radiation path of the signal in the high frequency band radiated by the antenna module, the radiation performance to the outside of the electronic device may be deteriorated by the metal frame.

According to embodiments of the disclosure, it is possible to provide an electronic device capable of avoiding the interference of a metal frame in communication using a signal in an ultra-high frequency band.

Technical Solution

According to an embodiment disclosed in this specification, an electronic device may include a housing including a front surface, a back surface opposite to the front surface, and a side surface surrounding a space between the front surface and the back surface and made of a metallic material, at least one antenna array disposed within the housing so as to radiate a millimeter wave signal toward an inside of the electronic device, a wireless communication circuit electrically connected to the at least one antenna array and communicating by using the millimeter wave signal, and a reflecting member arranged such that the millimeter wave signal radiated from the at least one antenna array is reflected toward an outside of the electronic device.

Furthermore, according to an embodiment disclosed in this specification, an electronic device may include a housing including a back surface opposite to the front surface, and a side surface surrounding a space between the front surface and the back surface and made of a metallic material, at least one antenna array disposed within the housing so as to radiate a millimeter wave signal toward an outside of the electronic device, a wireless communication circuit electrically connected to the at least one antenna array and communicating by using the millimeter wave signal, and a reflecting member. The side surface of the housing may include a first side surface and a second side surface opposite to the first side surface. The millimeter wave signal radiated from the at least one antenna array may be reflected by the first side surface in the direction of the second side surface. The millimeter wave signal reflected from the first side surface in the direction of the second side surface may be reflected back in the direction of the first side surface by the reflecting member.

Advantageous Effects

According to embodiments disclosed in this specification, an electronic device may maintain the communication performance using a signal in the ultra-high frequency band while providing a design aesthetic sensibility using a metal frame. Besides, a variety of effects directly or indirectly understood through the disclosure may be provided.

DESCRIPTION OF DRAWINGS

With regard to description of drawings, the same or similar components may be marked by the same or similar reference numerals.

MODE FOR INVENTION

Figure 1:
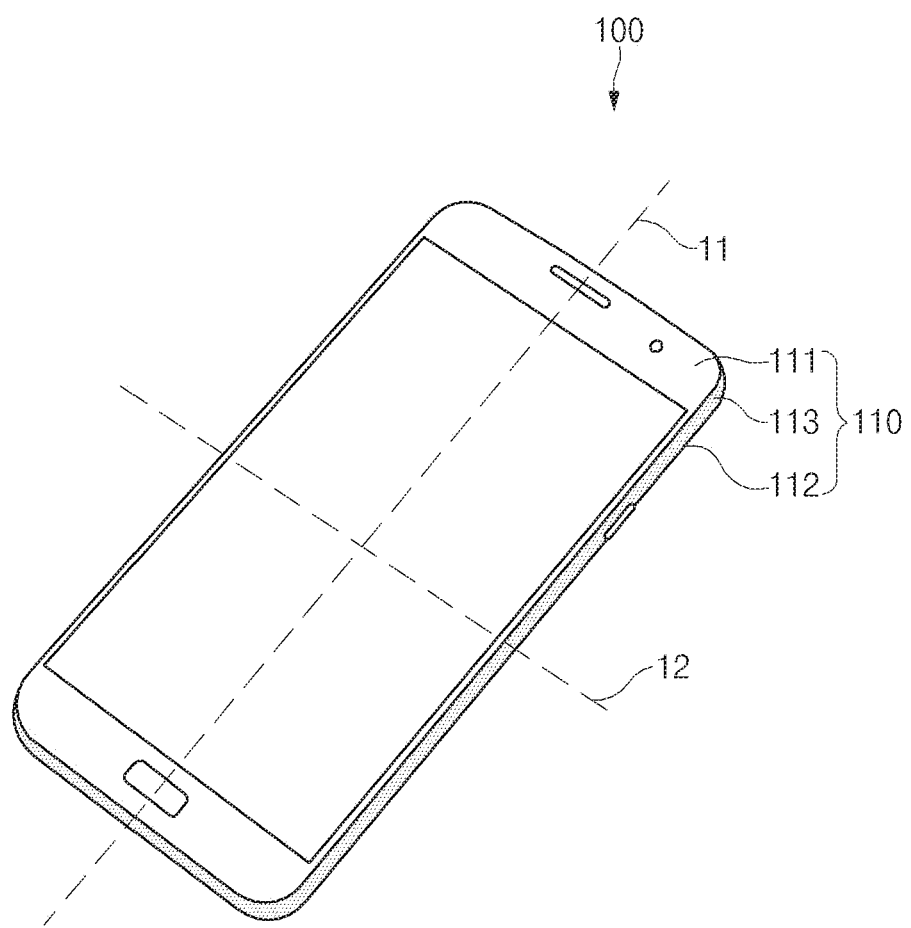
FIG. 1 illustrates an electronic device, to which a metal frame is applied, according to an embodiment.

FIG. 1 illustrates an electronic device, to which a metal frame is applied, according to an embodiment.

Referring to FIG. 1, an electronic device 100 may be surrounded by a housing 110. According to an embodiment, the housing 110 may include a front surface 111, a back surface 112 opposite to the front surface 111, and a side surface surrounding a space between the front surface 111 and the back surface 112. In an embodiment, the front surface 111, the back surface 112, and the side surface 113 may have corresponding components, respectively. For example, a cover glass may be disposed on the front surface 111, a cover of a plastic material may be disposed on the back surface 112, and a metal frame may be disposed on the side surface 113. However, in another embodiment, the front surface 111, the back surface 112, and the side surface 113 may be variously implemented. For example, the back surface 112 and the side surface 113 may be implemented as a uni-body. For another example, the left/right portions of the front surface 111 and the side surface 113 are implemented with a curved display; the upper/lower portions of the back surface 112 and the side surface 113 may be implemented with a uni-body.

In an embodiment, the display may be exposed through a part of the front surface 111 of the electronic device 100. The user may recognize the screen of the electronic device 100 through the display. In an embodiment, the display may also be exposed to at least part of the front surface 111 and the side surface 113 of the electronic device 100.

According to an embodiment, as illustrated in FIG. 1, the front surface 111 and the back surface 112 of the housing 110 may have a rounded rectangular shape. The rounded rectangle may be understood as a rectangle with rounded corners. According to another embodiment, the front surface 111 and the back surface 112 of the housing 110 may have a circular, elliptical, or rectangular shape.

According to an embodiment, the front surface 111, the back surface 112, and the side surface 113 of the housing 110 may be made of different materials. For example, the front surface 111 and the back surface 112 may be implemented with tempered glass, reinforced plastic, a flexible polymer material, or the like. The side surface 113 may be formed of metal, such as aluminum, zinc, or magnesium, or an alloy thereof.

According to an embodiment, the electronic device 100 may include an antenna module for wireless communication inside the housing 110. According to another embodiment, at least part of the antenna module may be exposed outside the housing 110. For the good communication performance of the electronic device 100, the antenna module may have the radiation performance of a specified level or higher toward all of the front surface 111, the back surface 112, and the side surface 113 of the housing 110.

According to various embodiments, the antenna module may radiate a signal in a specified direction inside the electronic device 100. For example, the antenna module may radiate a signal in the inner direction of the electronic device 100 or may radiate a signal in the outer direction of the electronic device 100.

In this specification, the inner direction may be understood as a direction facing the central axis 11 or 12 of the electronic device 100 from the side surface 113 of the housing 110; the outer direction may be understood as the direction facing the side surface 113 of the housing 110 from the central axis 11 or 12 of the electronic device 100. For example, it may be understood that the central axis 11 or 12 of the electronic device 100 is an axis that is parallel to two faces facing each other and bisects the square or substantial square when the side surface 113 of the electronic device 100 is in the form of a square or substantial square. In this case, the electronic device 100 may have two central axes 11 and 12 along two opposite sides among the side surfaces 113. For another example, when the side surface 113 of the electronic device 100 is in a shape of a circle, the center of the electronic device 100 may be understood as the axis passing through the center of the circle and bisecting the circle.

According to an embodiment, the electronic device 100 may transmit a signal to an external electronic device through the antenna module or may receive a signal from the external electronic device. According to an embodiment, the electronic device 100 may communicate with the external electronic device using a millimeter wave signal. The millimeter wave signal may be understood, for example, as a signal, a wavelength of which is a millimeter unit, or a signal having a frequency of a band ranging from 20 GHz to 100 GHz. In various embodiments, the signal having a frequency of 20 GHz may have a wavelength of about 15 mm; the signal having a frequency of 100 GHz may have a wavelength of about 3 mm.

In this disclosure, the description given with reference to FIG. 1 may be identically applied to components which have the same reference numerals as those of the electronic device 100 illustrated in FIG. 1.

Figure 2:
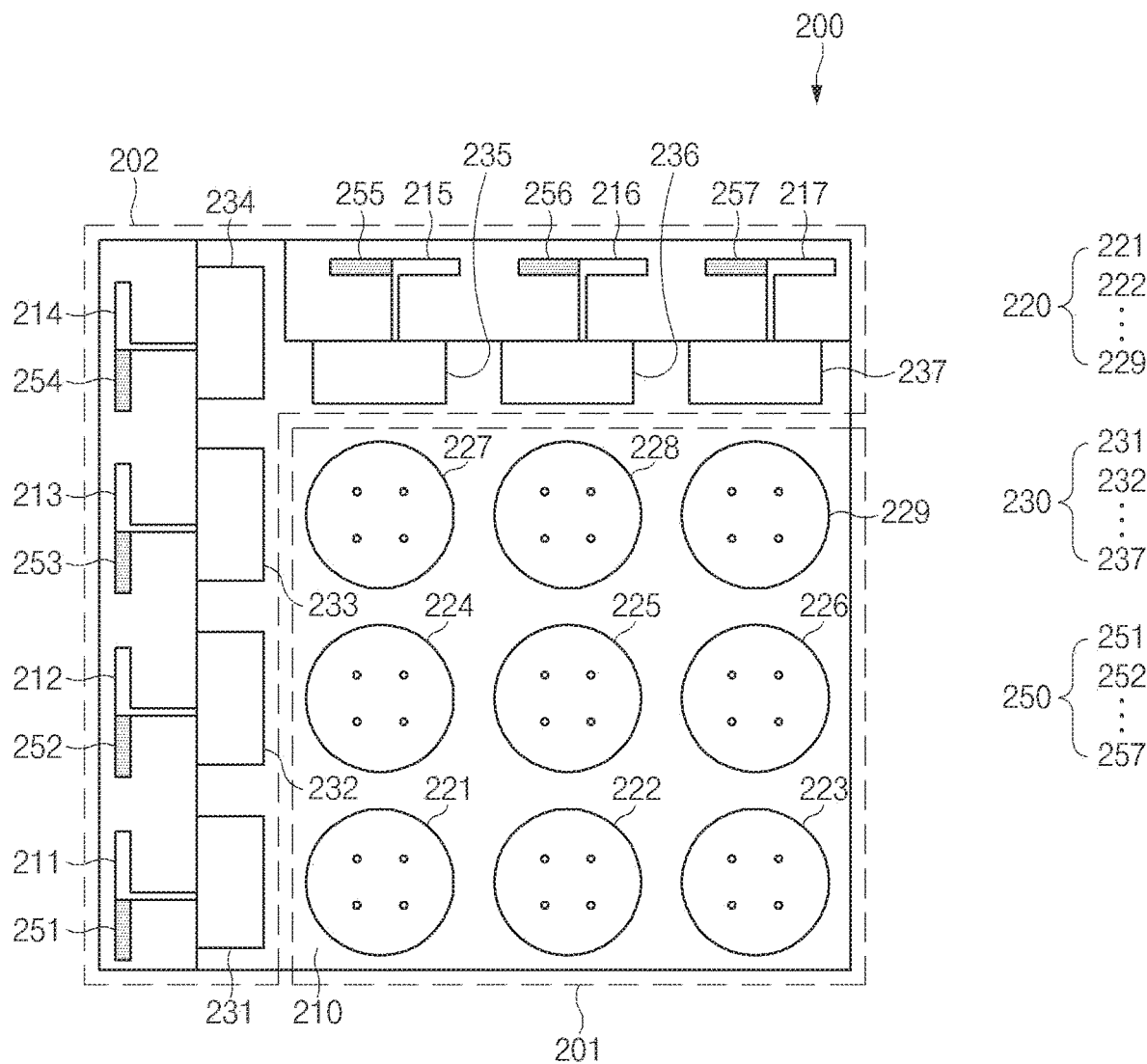
FIG. 2 illustrates an antenna module included in an electronic device according to an embodiment.

FIG. 2 illustrates an antenna module included in an electronic device according to an embodiment.

Referring to FIG. 2, an antenna module 200 according to an embodiment may include a first antenna array 201 and a second antenna array 202. According to various embodiments, the antenna module 200 may not include some of the components illustrated in FIG. 2 or may further include a component not illustrated in FIG. 2. For example, the antenna module 200 may include only the second antenna array 202 without the first antenna array 201.

Figure 12:
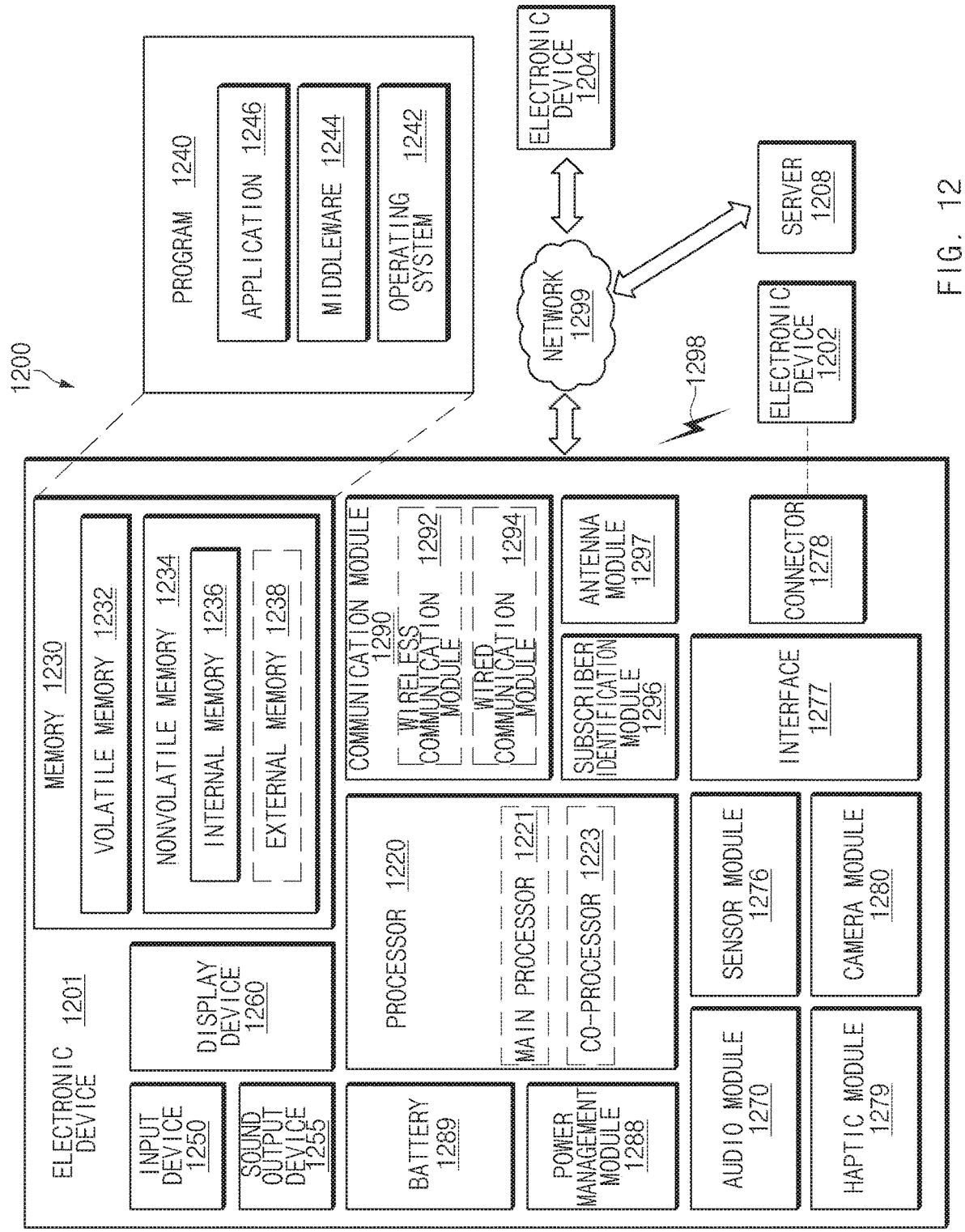
FIG. 12 illustrates a block diagram of an electronic device in a network environment according to various embodiments.

According to an embodiment, the antenna module 200 may be included in the electronic device 100 illustrated in FIG. 1 (or the electronic device 1201 shown in FIG. 12). The antenna module 200 may be electrically connected to a wireless communication circuit (e.g., the wireless communication module 1292 of FIG. 12), and may receive a signal from an external device or transmit the signal to the external device.

According to an embodiment, the first antenna array 201 may include a plurality of circular patches 220. The plurality of circular patches 220 may operate as radiators. For example, the plurality of circular patches 220 may be arranged in the form of a 3×3 array on a ground member.

According to an embodiment, the second antenna array 202 may be disposed adjacent to at least one side surface of the first antenna array 201. For example, the second antenna array 202 may be disposed adjacent to the upper end and left-side end of the first antenna array 201.

According to an embodiment, the second antenna array 202 may include a plurality of square patches 230 disposed adjacent to the first antenna array 201. The plurality of rectangular patches 230 may be radiators for vertically polarized waves.

According to an embodiment, the second antenna array 202 may include a plurality of straight radiators 250 disposed adjacent to the plurality of extension parts 211 to 217 of a ground member. The plurality of straight radiators 250 may be radiators for horizontally polarized waves. For example, a first straight radiator 251 may constitute a first dipole antenna together with a first extension part 211 connected to the ground member. For another example, second to seventh straight radiators 252 to 257 may constitute second to seventh dipole antennas together with the second to seventh extension parts 212 to 217, respectively.

According to an embodiment, the antenna module 200 may include a substrate that supports the ground member, the plurality of circular patches 220, a plurality of square patches 230, the plurality of straight radiators 250, and the like.

Figure 3:
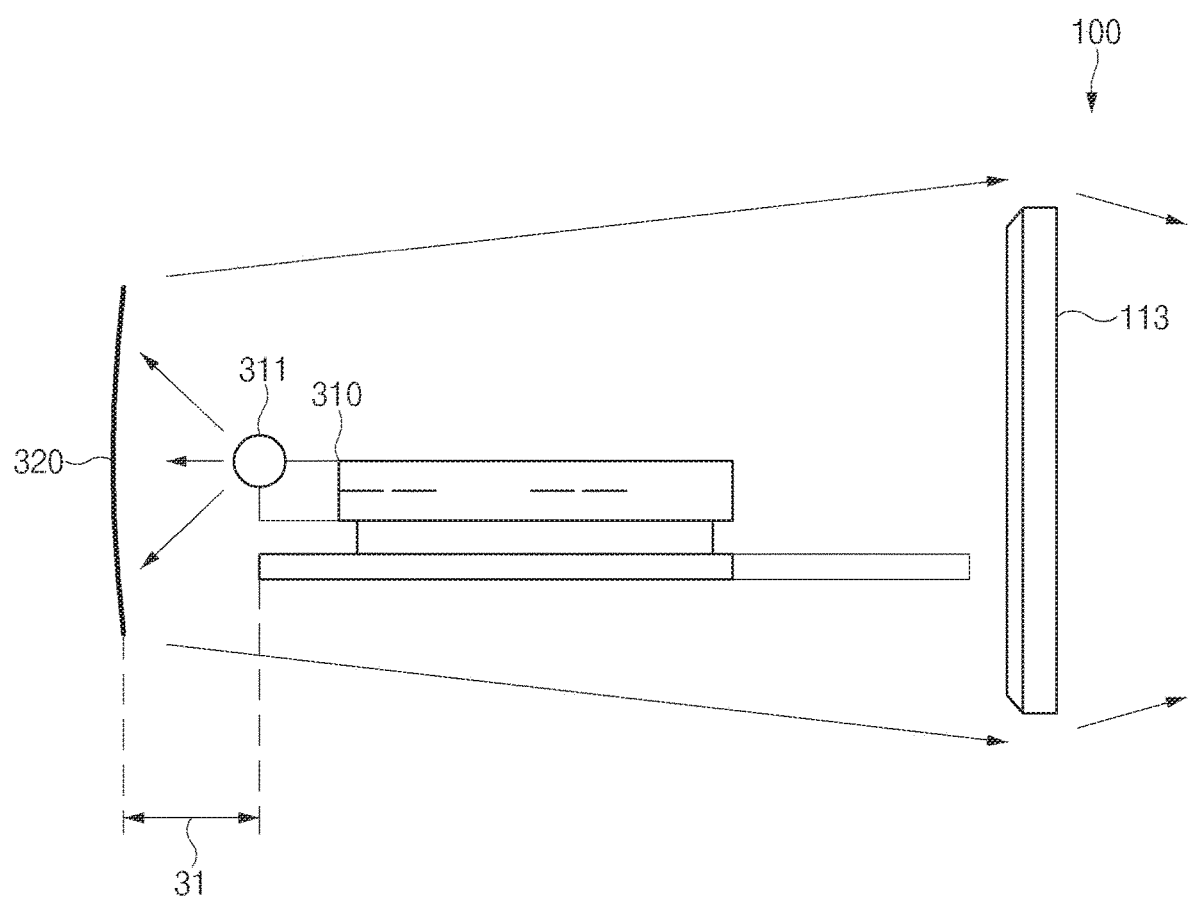
FIG. 3 illustrates a path of a signal transmitted by an electronic device according to an embodiment.

FIG. 3 illustrates a path of a signal transmitted by an electronic device according to an embodiment.

Referring to FIG. 3, the electronic device 100 may include the side surface 113 of the housing 110, an antenna array 310, and a reflecting member 320. According to various embodiments, the electronic device 300a may further include a component not illustrated in FIG. 3. For example, the electronic device 100 may further include the front surface 111 and the back surface 112 of the housing 110 not illustrated in FIG. FIG. 3 and may further include a wireless communication circuit. In an embodiment, the wireless communication circuit is electrically connected to an antenna array and may be configured to communicate by using a millimeter wave signal.

In FIG. 3, the left side may be understood as the inner direction of the electronic device 100 with respect to the side surface 113 of the housing 110; the right side may be understood as the outer direction of the electronic device 100 with respect to the side surface 113 of the housing 110.

The side surface 113 of the housing 110 may be understood as a part of the housing 110 illustrated in FIG. 1. According to an embodiment, the side surface 113 of the housing 110 may be formed of a metal material. As described above, the housing 110, the part of which is formed of a metal material, may also be referred to as a metal frame.

The antenna array 310 may be understood as a part of the antenna module 200 illustrated in FIG. 2. For example, the antenna array 310 may be understood as the second antenna array 202 illustrated in FIG. 2. In an embodiment, the electronic device 100 may include a plurality of the antenna arrays 310.

According to an embodiment, the antenna array 310 may include a plurality of radiators 311. Each of the plurality of radiators 311 may be arranged to radiate signals toward the side surface 113 of the electronic device 100 through the reflecting member 320. The electronic device 100 may communicate with a network (e.g., a base station) through the antenna array 310.

Because the millimeter wave signal has strong straightness, when the millimeter wave signal is radiated directly toward the outside from the antenna array 310, the side surface 113 of the housing 110, which is a metallic material, may be affected. For example, most of the millimeter wave signals radiated directly toward the outside may be reflected toward the inside by the side surface 113 formed of a metal material. On the other hand, as illustrated in FIG. 3, when the millimeter wave signal is radiated from the antenna array 310 toward the inside and then is reflected toward the outside by the reflecting member 320, the signal may secure the distance and angle that are capable of avoiding the side surface 113 of the housing 110. In this case, the millimeter wave signal may avoid the influence of the side surface 113 of the housing 110 formed of a metal material.

The reflecting member 320 may cause the millimeter wave signal radiated from the antenna array 310 to be reflected toward the outside of the electronic device 100. In an embodiment, the reflecting member 320 may be formed of a metallic material.

According to an embodiment, the shape of the reflecting member 320 may vary depending on the mounting space of the electronic device 100. For example, the reflecting member 320 may be in the parabolic shape. In this case, the radiator 311 of the antenna array 310 may be located at the focus of the parabola. When the millimeter wave signal is radiated from the focus of the parabola toward the reflecting member 320, the radiation shape of the reflected signal may be symmetrical shape with the center at the focus. For another example, the reflecting member 320 may be in a planar shape, a spherical shape, or a half-parabolic shape.

According to an embodiment, the reflecting member 320 may be disposed spaced from the antenna array 310 by a specified distance 31 in the inner direction of the electronic device 100. The communication performance of the electronic device 100 may vary depending on the specified distance 31. In an embodiment, the specified distance 31 may be determined such that the intensity of the millimeter wave signal radiated to the outside of the electronic device 100 is strongest. For example, the specified distance 31 may be a distance that causes the signal radiated from the antenna array 310 and the signal reflected by the reflecting member 320 to form constructive interference.

According to an embodiment, the millimeter wave signal radiated from the antenna array 310 is radiated toward the inside of the electronic device 100, but some of the signals may be radiated toward the outside of the electronic device 100. Accordingly, a component directly radiated toward the outside of the electronic device 100 and a component reflected toward the outside of the electronic device 100 by the reflecting member 320 may form constructive interference depending on the specified distance 31.

The signal reflected by the reflecting member 320 may have a phase change of 180 degrees. When the phase difference between the signal reflected by the reflecting member 320 toward the outside of the electronic device 100 and the signal radiated directly toward the outside of the electronic device 100 becomes the integer multiple of the wavelength of the signal, the constructive interference may be formed. In an embodiment, when the specified distance 31 is ¼ wavelength or substantially ¼ wavelength of the millimeter wave signal, the constructive interference may be formed. Accordingly, when the reflecting member 320 is spaced by a ¼ wavelength of the millimeter wave signal radiated from the antenna array 310, the communication performance of the electronic device 100 may be maximized.

According to an embodiment, the electronic device 100 may include a wireless communication circuit. In an embodiment, the wireless communication circuit is electrically connected to an antenna array 310 and may be configured to communicate by using a millimeter wave signal. In an embodiment, the wireless communication circuit may implement multi input multi output (MIMO), using the plurality of the antenna arrays 310 or the diversity of the received signal.

In this disclosure, the description given with reference to FIG. 3 may be identically applied to components which have the same reference numerals as those of the electronic device 100 illustrated in FIG. 3.

Figure 4A:
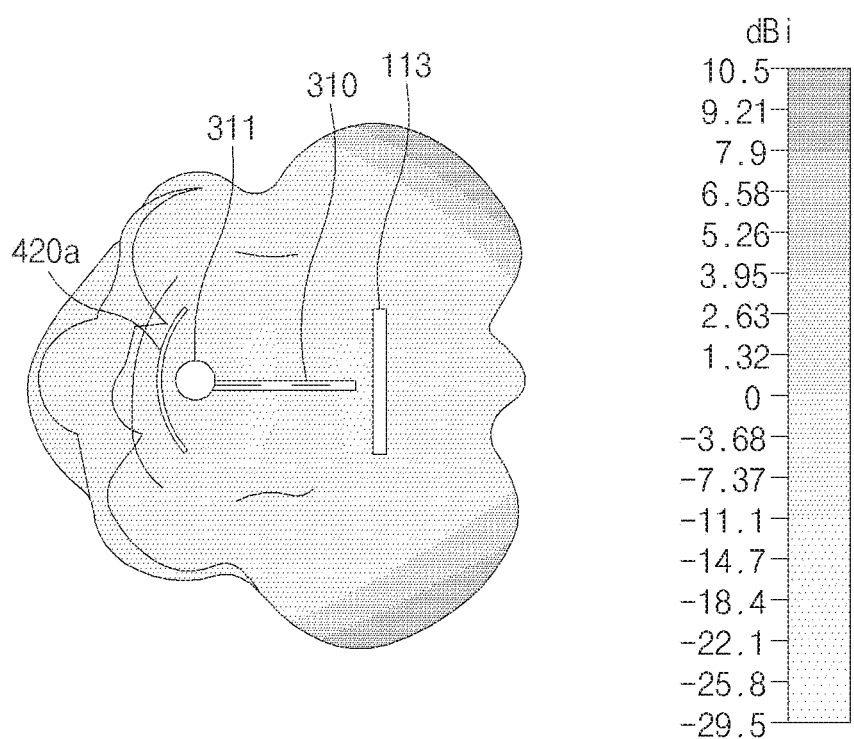
FIG. 4A illustrates a radiation pattern of an electronic device including a parabolic reflecting member according to an embodiment.
Figure 4B:
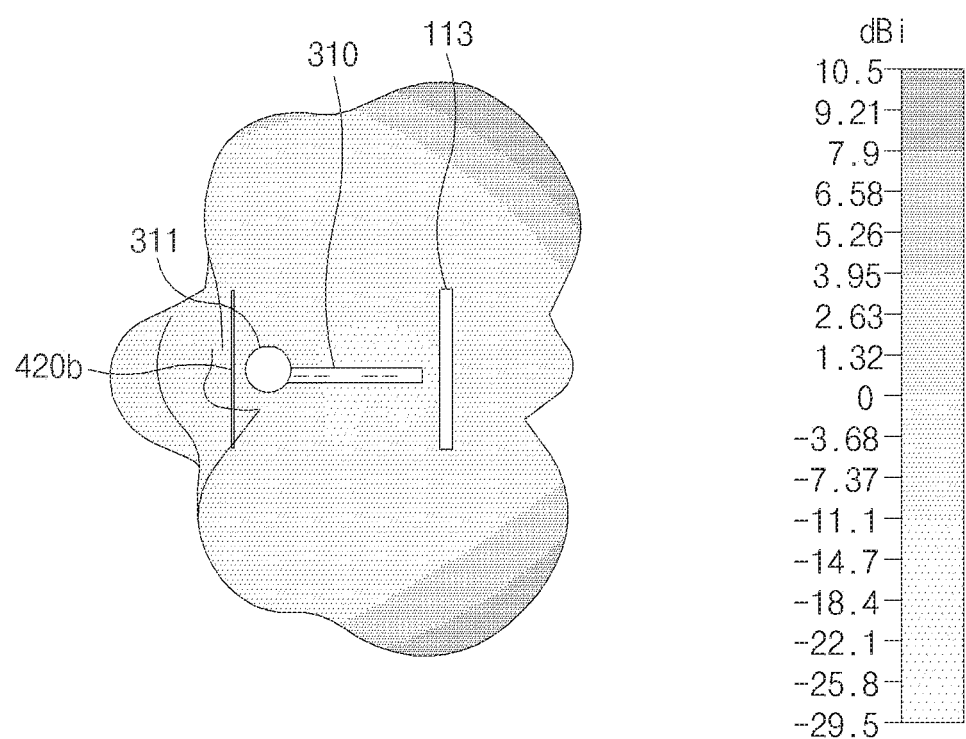
FIG. 4B illustrates a radiation pattern of an electronic device including a planar reflecting member according to an embodiment.

FIG. 4A illustrates a radiation pattern of an electronic device including a parabolic reflecting member according to an embodiment. FIG. 4B illustrates a radiation pattern of an electronic device including a planar reflecting member according to an embodiment.

Referring to FIGS. 4A and 4B, the radiation patterns of the electronic device 100 according to the shapes of reflecting members 420a and 420b may be identified. According to various embodiments, the shapes of the reflecting members 420a and 420b may include a parabolic shape, a planar shape, a half-parabolic shape, or the like. For example, as illustrated in FIG. 4A, the reflecting member 420a may have a parabolic shape. For another example, as illustrated in FIG. 4B, the reflecting member 420b may have a planar shape.

When the reflecting members 420a and 420b are parabolic and planar, high radiation gains may appear outside the electronic device (i.e., the right direction of the side surface 113 of the housing 110). Accordingly, the electronic device may transmit a millimeter wave signal in the intended direction.

The maximum magnitude of the radiation gain of the electronic device including the parabolic reflecting member 420a may be greater than the radiation gain of the electronic device including the planar reflecting member 420b by about 1 dB. Accordingly, the electronic device including the parabolic reflecting member 420a may have higher communication performance than the electronic device including the planar reflecting member 420b.

In an embodiment, when there is not enough mounting space in the electronic device, a planar reflective member 420b may be used. The planar reflecting member 420b is somewhat more disadvantageous than the parabolic reflecting member 420a at maximum gain, but may be more advantageous in view of the mounting space.

The radiation patterns illustrated in FIGS. 4A and 4B are to identify the radiation effect on the side surface by the reflecting members 420a and 420b, and the shapes of reflecting members 420a and 420b are not limited. The reflecting members 420a and 420b may be implemented in various shapes with the direction and performance desired by a designer, in addition to the parabolic and straight lines.

Figure 5A:
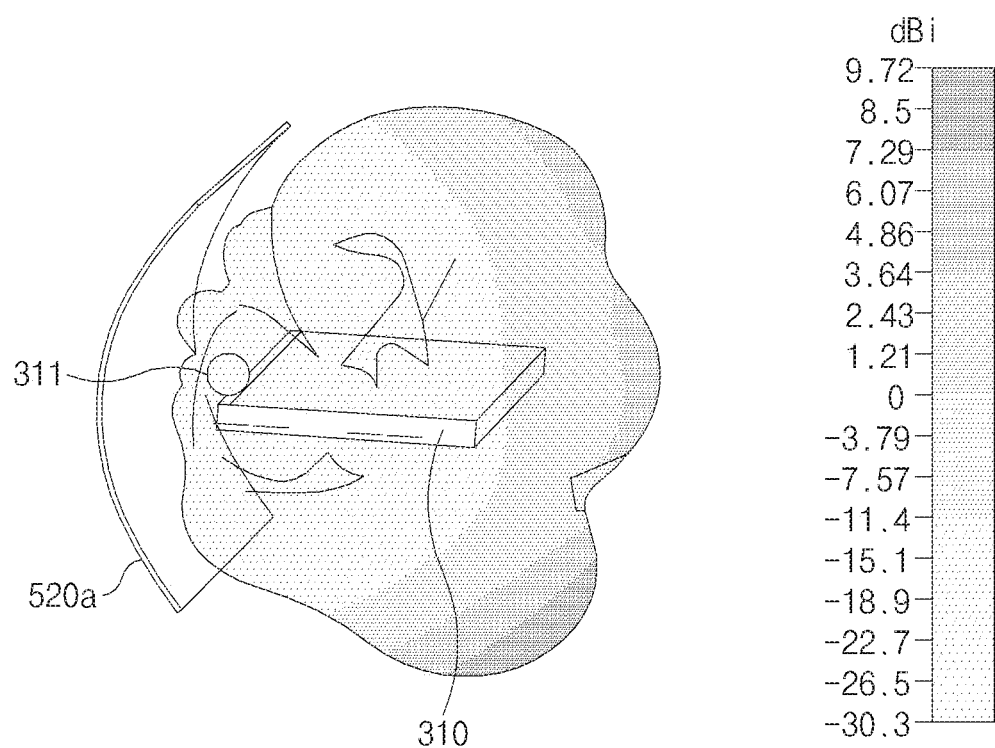
FIG. 5A illustrates a radiation pattern of an electronic device including a symmetrical reflecting member according to an embodiment.
Figure 5B:
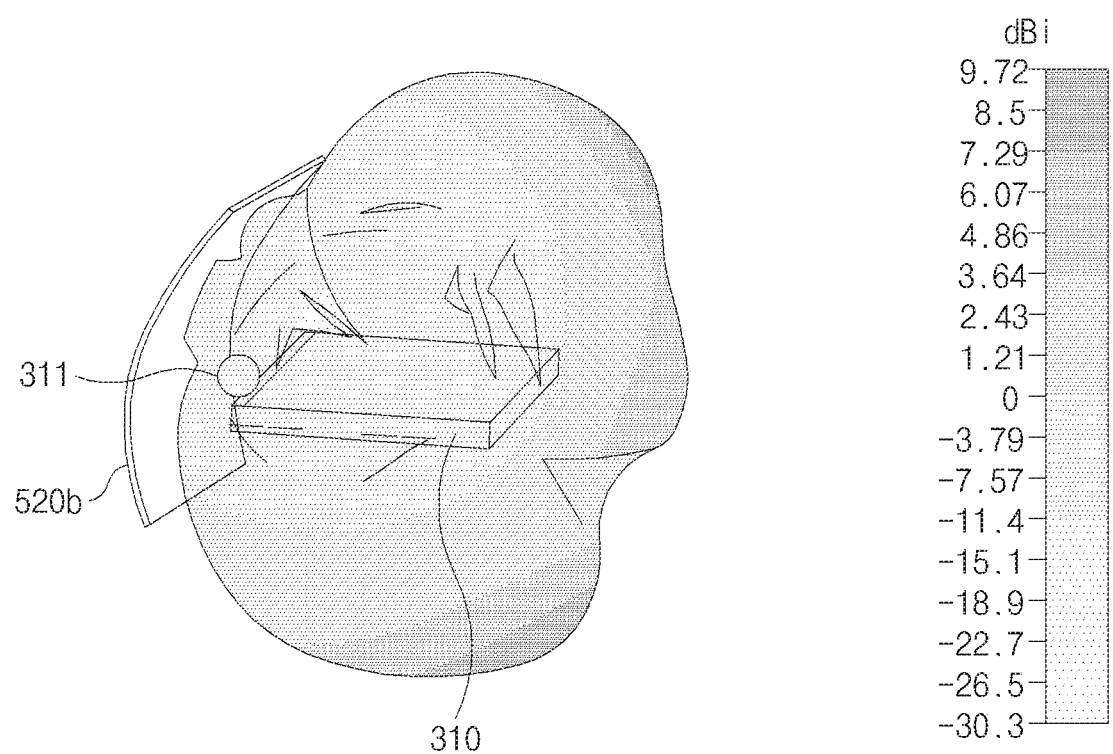
FIG. 5B illustrates a radiation pattern of an electronic device including an asymmetrical reflecting member according to an embodiment.

FIG. 5A illustrates a radiation pattern of an electronic device including a symmetrical reflecting member according to an embodiment. FIG. 5B illustrates a radiation pattern of an electronic device including an asymmetrical reflecting member according to an embodiment.

Referring to FIGS. 5A and 5B, the radiation patterns of an electronic device according to the shapes of reflecting members 520a and 520b may be identified. According to various embodiments, the reflecting members 520a and 520b may be symmetrical or asymmetrical with respect to the antenna array 310. For example, as illustrated in FIG. 5B, the reflecting member may be in a parabolic shape having a longer upper portion with respect to the antenna array 310. For another example, the upper portion of the reflecting member may be in a parabolic shape; the lower portion of the reflecting member may be in a planar shape.

As illustrated in FIG. 5A, when the reflecting member 520a is symmetric with respect to the antenna array 310, the radiation pattern of the electronic device may also appear symmetrically. As illustrated in FIG. 5B, when the reflecting member 520a is asymmetric with respect to the antenna array 310, the radiation pattern of the electronic device may also appear asymmetrically. For example, when the electronic device includes a reflecting member having a longer upper portion with respect to the antenna array 310, the radiation pattern may be biased downward.

Referring to FIGS. 5A and 5B, when the reflecting members 520a and 520b are symmetric and asymmetric, the radiation patterns of the electronic device may be compared. It may be seen in FIG. 5B that even though the reflecting member 520b is asymmetric, the direction, in which the radiation pattern is biased, only changes, and a high radiation gain appears toward the outside of the electronic device.

According to various embodiments, a plurality of electrical elements are disposed inside the electronic device, and it may be difficult to mount the symmetrical reflecting member 520a. In this case, the asymmetric reflecting member 520b may be used.

Figure 6:
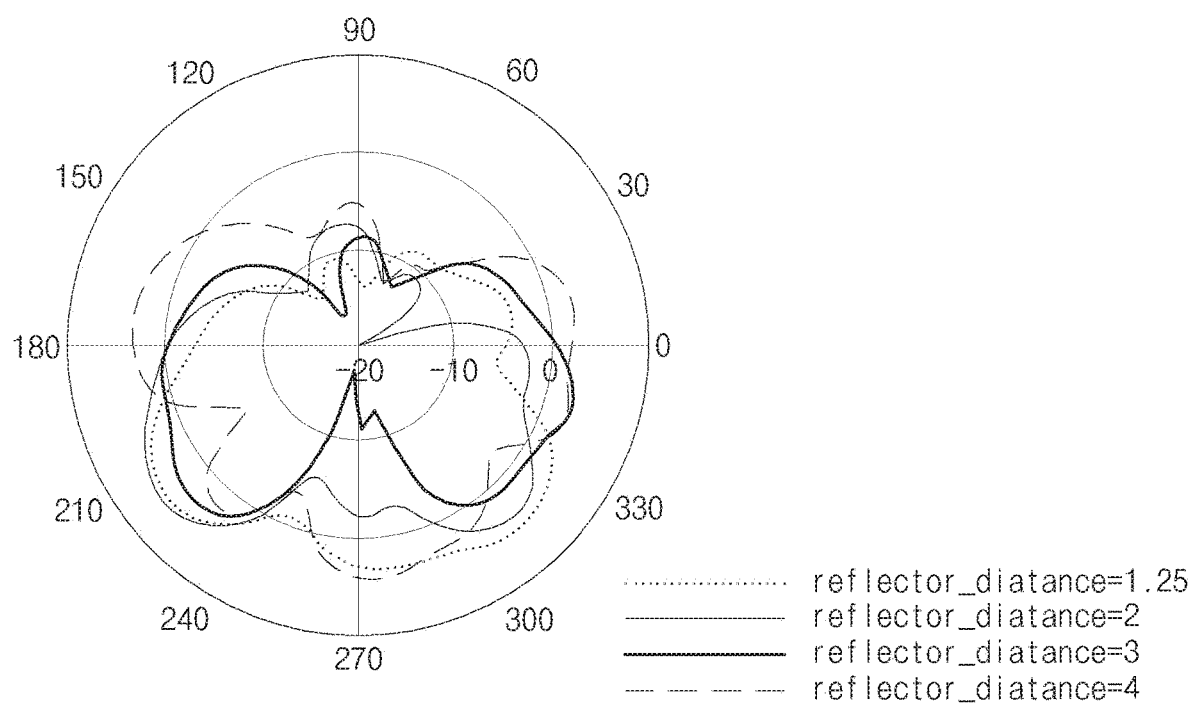
FIG. 6 illustrates radiation performance of an antenna device according to a distance between an antenna array and a reflecting member, according to an embodiment.

FIG. 6 illustrates radiation performance of an antenna device according to a distance between an antenna device and a reflecting member, according to an embodiment.

Referring to FIG. 6, a graph indicating the radiation performance according to a distance between the antenna array 310 and the reflecting member 320 is illustrated. As mentioned in the description of FIG. 3, the specified distance 31 between the antenna array 310 and the reflecting member 320 may affect the radiation performance of the electronic device 100. The graph illustrated in FIG. 6 indicates experimental results when the frequency of a millimeter wave signal is 60 GHz in a free space (e.g., a space having permittivity of 1). The direction of 270 degrees illustrated in FIG. 6 indicates the outside of the electronic device 100.

The millimeter wave signal with the frequency of 60 GHz has the wavelength of 5 mm According to various embodiments, when the specified distance 31 between the antenna array 310 and the reflecting member 320 is the odd multiple of ¼ wavelength, the millimeter wave signal radiated to the outside of the electronic device 100 may form constructive interference. Accordingly, the specified distance 31 for the constructive interference may be the odd multiple of 1.25 mm.

Referring to the graph illustrated in FIG. 6, it may be seen that the radiation performance is evenly excellent in the outer direction of the electronic device of the antenna array 310 when the specified distance 31 is 1.25 mm. In addition, it may be seen that the radiation performance of the antenna array 310 is excellent in some directions even when the specified distance 31 is 4 mm close to 3.75 mm, which is 3 times 1.25 mm.

Figure 7:
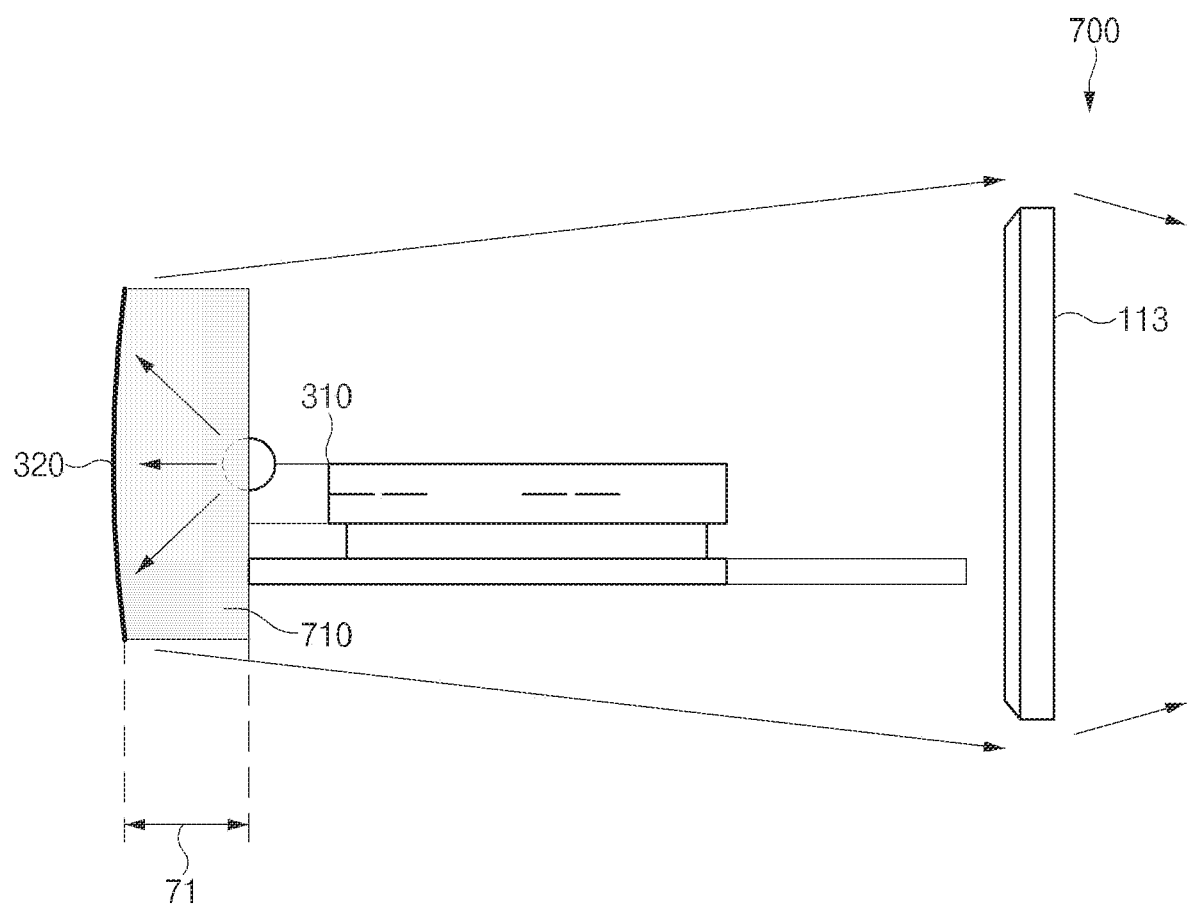
FIG. 7 illustrates an electronic device including a dielectric according to an embodiment.

FIG. 7 illustrates an electronic device including a dielectric according to an embodiment.

Referring to FIG. 7, an electronic device 700 may include the side surface 113 of the housing 110, the antenna device 310, the reflecting member 320, and a dielectric 710. In FIG. 7, with regard to the description given with reference to FIG. 3, additional description will be omitted to avoid redundancy.

According to an embodiment, the dielectric 710 may be disposed in a space between the antenna array 310 and the reflecting member 320. The dielectric 710 may fill all or part of the space. The dielectric 710 illustrated in FIG. 7 is shown in a rectangular shape disposed only between the antenna array 310 and the reflecting member 320, but the shape of the dielectric 710 is not limited thereto. For example, the dielectric 710 may be in the form of a fan with the center at the radiator 311 of the antenna array 310. For another example, the dielectric 710 may not only fill the space between the antenna array 310 and the reflecting member 320, but may also fill the space between the side surface 113 of the housing 110 and the reflecting member 320.

According to an embodiment, the wavelength of the millimeter wave radiated by the antenna array 310 may vary within the dielectric 710. For example, the wavelength may be inversely proportional to the square root of the permittivity of the dielectric 710. For example, the wavelength of the signal inside the dielectric 710 with the permittivity of 4 may be half of the wavelength of the signal in a free space (permittivity: 1).

According to an embodiment, when the wavelength of the millimeter wave signal decreases due to the influence of dielectric 710, the specified distance 71 between the antenna array 310 and the reflecting member 320 for constructive interference may also be reduced. As mentioned in the description of FIG. 6, when the specified distance 71 between the antenna array 310 and the reflecting member 320 is the odd multiple of ¼ wavelength, the millimeter wave signal radiated to the outside of the electronic device may form the constructive interference. In the case of the millimeter wave signal of a frequency of 60 GHz, the specified distance 71 for the constructive interference may be the odd multiple of 0.625 mm.

According to an embodiment, the internal mounting space of the electronic device 700 may be limited. In this case, as illustrated in FIG. 7, when the dielectric 710 is interposed between the antenna array 310 and the reflecting member 320, the radiation of a millimeter wave signal may be implemented in a narrow space.

Figure 8A:
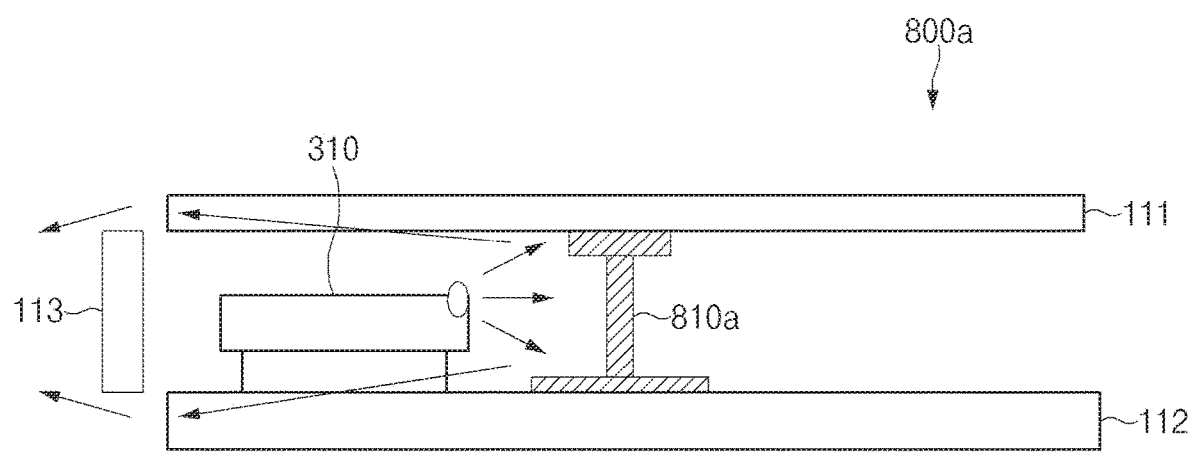
FIG. 8A illustrates an electronic device including a bracket according to an embodiment.
Figure 8B:
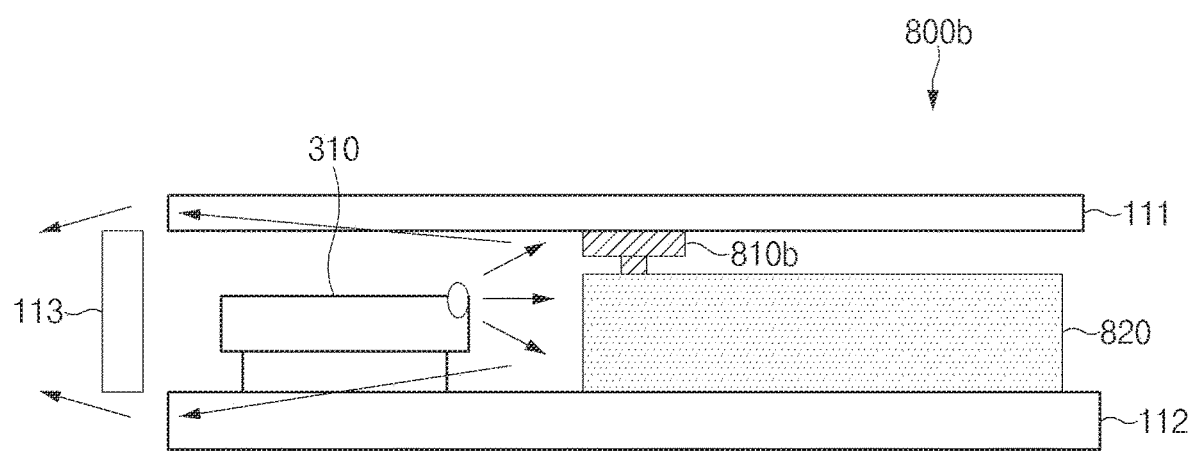
FIG. 8B illustrates an electronic device including a shield can according to an embodiment.
Figure 8C:
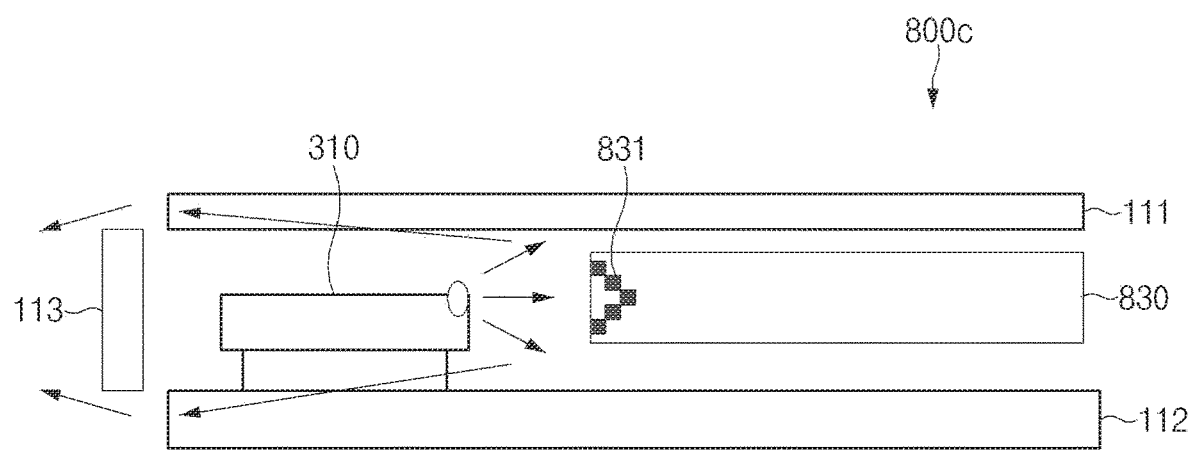
FIG. 8C illustrates an electronic device including a printed circuit board (PCB) according to an embodiment.
Figure 8D:
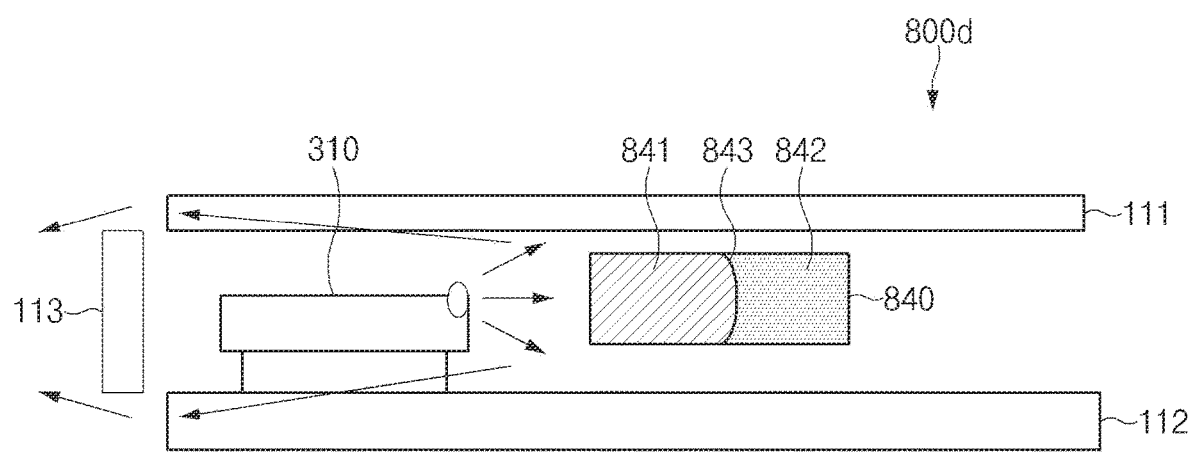
FIG. 8D illustrates an electronic device including a plurality of dielectrics according to an embodiment.

FIG. 8A illustrates an electronic device including a bracket according to an embodiment. FIG. 8B illustrates an electronic device including a shield can according to an embodiment. FIG. 8C illustrates an electronic device including a printed circuit board (PCB) according to an embodiment. FIG. 8D illustrates an electronic device including a plurality of dielectrics according to an embodiment.

Referring to FIGS. 8A, 8B, and 8C, the reflecting member 320 may be implemented in various configurations included in the electronic devices 800a, 800b, and 800c. For example, the reflecting member 320 may be implemented by using a bracket 810 illustrated in FIG. 8A, a shield can 820 illustrated in FIG. 8B, or a PCB 830 illustrated in FIG. 8C.

In various embodiments, each of metallic elements capable of reflecting a millimeter wave signal radiated from the antenna array 310 may be used as the reflecting member 320. Accordingly, when the existing configurations included in the electronic devices 800a, 800b, and 800c are used, embodiments of the disclosure may be implemented without additionally arranging the reflecting member 320. In this case, it is possible to increase efficiency in terms of the mounting space of the electronic device 800a, 800b, or 800c.

The bracket 810a illustrated in FIG. 8A, the shield can 820 illustrated in FIG. 8B, the PCB 830 illustrated in FIG. 8C, and an injection-molding material 840 illustrated in FIG. 8D may be included in the electronic device. The bracket 810a may be interposed between the front surface 111 and the back surface 112 of the housing 110 in the electronic device 800a and may fix the shape of the housing 110. The shield can 820 may shield electromagnetic waves occurring inside the electronic device 800b, thereby protecting various electrical elements inside the shield can 820 from the electromagnetic waves. The PCB 830 may be a substrate on which various electrical elements and wires are disposed. When the side surface of the PCB 830 is plated with a metallic material or there is a via hole 831 filled with a metallic material inside the PCB 830, the metallic material may function as the reflecting member 320. For example, as illustrated in FIG. 8C, the PCB 830 may include a plurality of layers, and the via hole 831 may be formed in each layer. When viewed from the side surface, the location where the via hole 831 is formed may be determined to have a parabolic shape in a direction facing the antenna array 310. When the via hole 831 is filled with a metallic material, the PCB 830 may function as the parabolic reflecting member 320.

According to an embodiment, some components of the millimeter wave signal radiated from the antenna array 310 may not be all reflected by using only the shield can 820. In this case, as illustrated in FIG. 8B, the shield can 820 and the bracket 810b may simultaneously function as the reflecting member 320. The shield can 820 and the bracket 810b may reflect all components of the millimeter wave signal radiated from the antenna array 310 toward the side surface 113, by filling the space between the front surface 111 and the back surface 112 of the housing 110.

According to various embodiments, the bracket 810a or 810b, the shield can 820, or the PCB 830 may be modified in a partial shape to improve reflection efficiency.

Referring to FIG. 8D, the reflecting member 320 may be implemented through an injection-molding material 840 including a plurality of dielectrics 841 and 842. For example, the injection-molding material 840 may include a first dielectric 841 facing the antenna array 310 and a second dielectric 842 coupled with the first dielectric 841. For example, the boundary surface 843 between the first dielectric 841 and the second dielectric 842 may be parabolic. According to an embodiment, the permittivity of the first dielectric 841 may be less than that of the second dielectric 842.

According to various embodiments, when the parabolic reflecting member 320 is mounted inside the electronic device, the reflecting member 320 may be damaged by an external impact. When the reflecting member 320 is implemented by the injection-molding material 840 illustrated in FIG. 8D, the reflecting member 320 may be protected from the external impact.

According to various embodiments, the electronic devices 800a, 800b, 800c, and 800d illustrated in FIGS. 8A to 8D are exemplary, and the electronic devices 800a, 800b, 800c, and 800d may further include various electrical elements. For example, the electronic device 800c illustrated in FIG. 8C may further include other electrical elements disposed in a space between the front surface 111 or the back surface 112 of the housing 110 and the PCB 830. For another example, the electronic device 800d illustrated in FIG. 8D may further include other electrical elements disposed in a space between the front surface 111 or the back surface 112 of the housing 110 and the injection-molding material 840.

Figure 9:
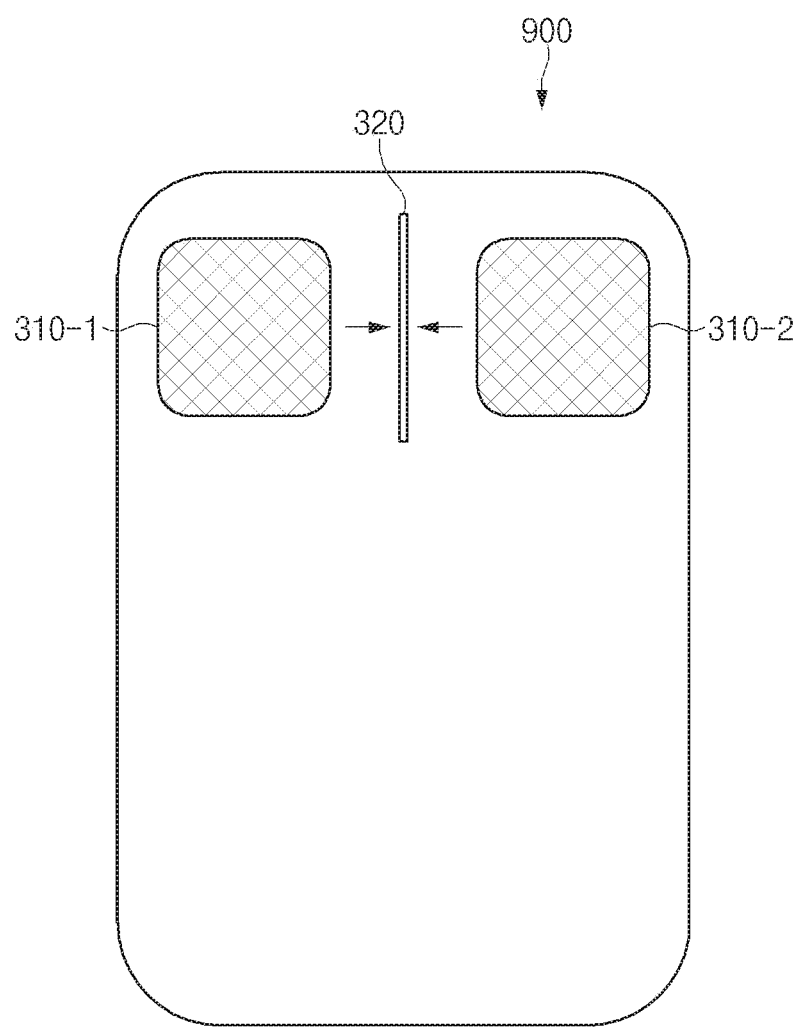
FIG. 9 is a view illustrating an electronic device including a plurality of antenna arrays according to various embodiments.

FIG. 9 illustrates an electronic device including a plurality of antenna devices according to various embodiments.

Referring to FIG. 9, an electronic device 900 may include a plurality of antenna devices 310-1 and 310-2. For example, as illustrated in FIG. 9, when viewed from above the front surface of the housing, the electronic device 900 may include a first antenna array 310-1 disposed at the left-top end and a second antenna array 310-2 disposed at the right-top end. For another example, the electronic device 900 may further include a third antenna array disposed at the left-bottom end and a fourth antenna array disposed at the right-bottom end.

According to an embodiment, the first antenna array 310-1 and the second antenna array 310-2 may receive the same signal. The electronic device 900 may perform diversity, using a signal received through the first antenna array 310-1 and a signal received through the second antenna array 310-2. The diversity may be understood as a reception method in which a single signal is obtained by synthesizing different received signals to increase the reliability of the received signal.

According to an embodiment, the electronic device 900 may implement multi input multi output (MIMO), using the first antenna array 310-1 and the second antenna array 310-2. The MIMO may refer to a wireless communication method that increases the capacity or efficiency of the wireless communication in proportion to a plurality of antenna arrays.

According to an embodiment, the diversity or the MIMO may be implemented by a wireless communication circuit included in the electronic device 900.

According to various embodiments, the electronic device 900 including the plurality of antenna arrays 310-1 and 310-2 may include at least one the reflecting member 320.

For example, as illustrated in FIG. 9, the electronic device 900 may include the single reflecting member 320 interposed between the first antenna array 310-1 and the second antenna array 310-2. In this case, the first antenna array 310-1 and the second antenna array 310-2 may share the reflecting member 320. The reflecting member 320 may reflect the first millimeter wave signal radiated from the first antenna array 310-1 toward the first side surface adjacent to the first antenna array 310-1 and may reflect the second millimeter wave signal radiated from the second antenna array 310-2 toward the second side surface adjacent to the second antenna array 310-2. According to various embodiments, the shared reflecting member 320 may be implemented with at least one of the bracket 810a, the shield can 820, and the PCB 830 illustrated in FIGS. 8A to 8C.

For another example the electronic device 900 may include a first reflecting member and a second reflecting member. The first reflecting member may reflect the first millimeter wave signal radiated from the first antenna array 310-1 toward the first side surface adjacent to the first antenna array 310-1. The second reflecting member may reflect the second millimeter wave signal radiated from the second antenna array 310-2 toward the second side surface adjacent to the second antenna array 310-2.

Figure 10:
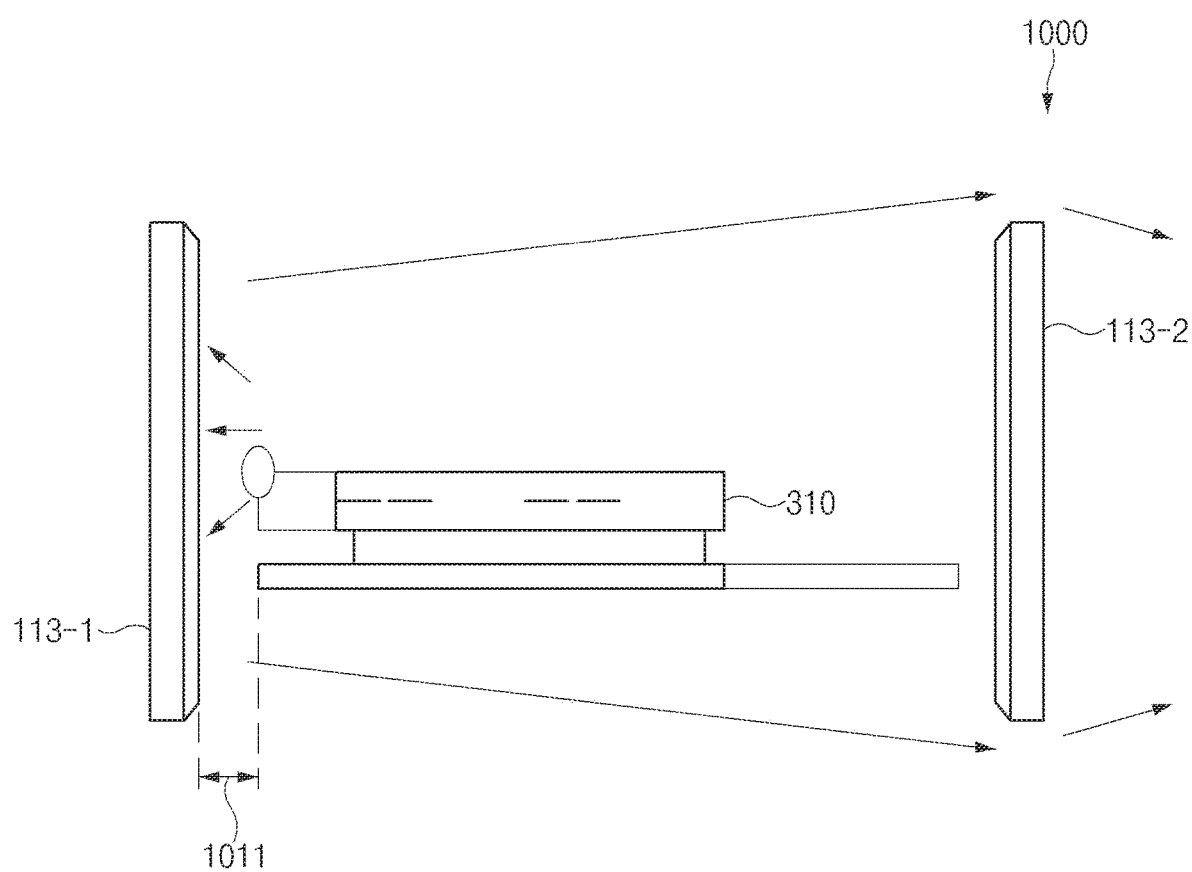
FIG. 10 illustrates a path of a signal transmitted by an electronic device according to an embodiment.

FIG. 10 illustrates a path of a signal transmitted by an electronic device according to an embodiment.

Referring to FIG. 10, an electronic device 1000 may include the antenna array 310, a first side surface 113-1, and a second side surface 113-2. The first side surface 113-1 and the second side surface 113-2 may be made of a metallic material. Accordingly, the first side surface 113-1 or the second side surface 113-2 may reflect the millimeter wave signal radiated from the antenna array 310. According to various embodiments, the electronic device 1000 may not include some of the components, and may further include components not listed. For example, the electronic device 1000 may further include a wireless communication circuit electrically connected to the antenna array 310 and configured to communicate by using a millimeter wave signal.

According to an embodiment, the antenna array 310 may radiate a millimeter wave signal toward the outside of the electronic device 1000. For example, the antenna array 310 adjacent to the first side surface 113-1 may radiate a millimeter wave signal toward the first side surface 113-1.

According to an embodiment, the first side surface 113-1 may reflect the millimeter wave signal radiated from the antenna array 310 in the direction of the second side surface 113-2. In this case, the millimeter wave signal may secure a sufficient distance and angle to avoid the second side surface 113-2 and may be radiated to the outside of the electronic device 1000 to communicate with the external electronic device.

According to an embodiment, the antenna array 310 may be arranged spaced from the first side surface 113-1 by a specified distance 1011. In an embodiment, the specified distance 1011 may be determined as a distance at which the millimeter wave signal radiated from the antenna array 310 and the millimeter wave signal reflected from the first side surface 113-1 may form constructive interference. For example, the specified distance 1011 may be ¼ wavelength of the millimeter wave signal.

According to an embodiment, the space between the antenna array 310 and the first side surface 113-1 may be filled with dielectric. In this case, the specified distance may be shorter than the distance in the case where there is no dielectric. For example, when the permittivity of the dielectric is 4, the specified distance 1011 may be shortened in half compared to the case where there is no dielectric.

According to an embodiment, the inside of the first side surface 113-1 may have various shapes. For example, the inside of the first side surface 113-1 may be implemented in any one of parabolic, planar, and half-parabolic shapes. According to an embodiment, the shape of the inner side of the first side surface 113-1 may be determined in consideration of the directivity of the reflected millimeter wave signal.

According to an embodiment, the electronic device 1000 may include the plurality of the antenna arrays 310. For example, the electronic device 1000 may include a first antenna array adjacent to the first side surface 113-1 and a second antenna array adjacent to the second side surface 113-2. The first antenna array may radiate a first millimeter wave signal toward the first side surface 113-1; the first side surface 113-1 may reflect the first millimeter wave signal in the direction of the second side surface 113-2. The second antenna array may radiate a second millimeter wave signal toward the second side surface 113-2; the second side surface 113-2 may reflect the second millimeter wave signal in the direction of the first side surface 113-1.

According to an embodiment, the locations of the first antenna array and the second antenna array may be adjusted such that the radiation of the first millimeter wave signal and the radiation of the second millimeter wave signal do not affect each other. For example, the first antenna array may be located on the upper portion when viewed from above the front surface of the electronic device 1000; the second antenna array may be located on the lower portion when viewed from above the front surface of the electronic device 1000

According to an embodiment, the wireless communication circuit included in the electronic device 1000 including the plurality of antenna arrays may implement diversity or MIMO by using the plurality of antenna arrays.

Figure 11:
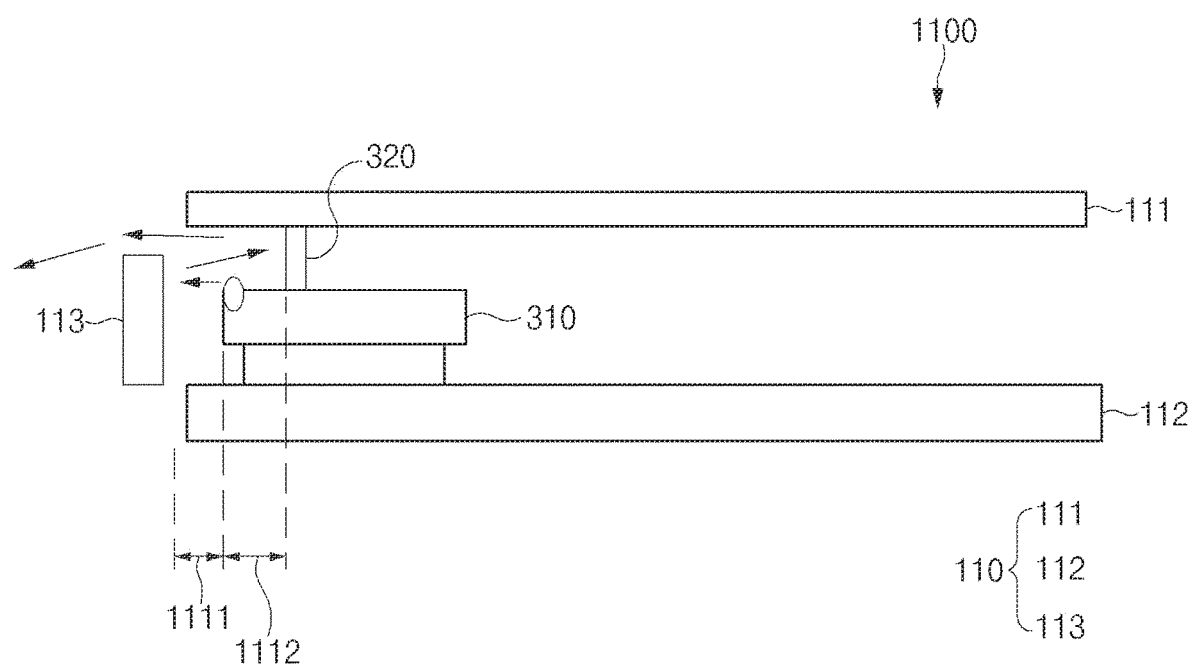
FIG. 11 illustrates a path of a signal transmitted by an electronic device according to an embodiment.

FIG. 11 illustrates a path of a signal transmitted by an electronic device according to an embodiment.

Referring to FIG. 11, an electronic device 1100 may include the housing 110, the antenna array 310, and the reflecting member 320. The side surface 113 of the housing 110 may be formed of a metallic material. Accordingly, the side surface 113 of the housing 110 may reflect the millimeter wave signal radiated from the antenna array 310. According to various embodiments, the electronic device 1100 may not include some of the components, and may further include components not listed. For example, the electronic device 1100 may further include a wireless communication circuit electrically connected to the antenna array 310 and configured to communicate by using a millimeter wave signal.

In FIG. 11, the left side may be understood as the outer direction of the electronic device 1100 with respect to the side surface 113 of the housing 110; the right side may be understood as the inner direction of the electronic device 1100 with respect to the side surface 113 of the housing 110.

According to an embodiment, the antenna array 310 may radiate a millimeter wave signal toward the outside of the electronic device 1100. For example, the antenna array 310 may radiate a millimeter wave signal toward the side surface 113 of the housing 110.

When the side surface 113 of the housing 110 is formed of a metallic material, the millimeter wave signal radiated from the antenna array 310 may be reflected inside the electronic device 1100. In this case, the side surface 113 of the antenna array 310 and the housing 110 may be spaced by a specified distance 1111 such that the millimeter wave signal forms constructive interference. For example, the specified distance 1111 may be ¼ wavelength of the millimeter wave signal.

According to an embodiment, the reflecting member 320 may re-reflect the reflected millimeter wave signal to the outside of the electronic device 1100. In this case, the millimeter wave signal may secure a sufficient distance and angle to avoid the side surface 113 of the housing 110 and may be radiated to the outside of the electronic device 1100 to communicate with the external electronic device.

In an embodiment, the reflecting member 320 may be interposed between the antenna array 310 and the front surface 111 of the housing 110 as illustrated in FIG. 11. In another embodiment, the reflecting member 320 may be interposed between the antenna array 310 and the back surface 112 of the housing 110.

In this case, the location of the reflecting member 320 may be determined such that the re-reflected millimeter wave signal forms the constructive interference with the millimeter wave signal radiated from the antenna array 310. For example, the reflecting member 320 may be arranged at a location spaced from the radiators 311 of the antenna array 310 by a specified distance 1112 in an inner direction. For example, the specified distance 1112 may be ¼ wavelength of the millimeter wave signal.

FIG. 12 is a block diagram illustrating an electronic device 1201 in a network environment 1200 according to various embodiments.

Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments, at least one (e.g., the display device 1260 or the camera module 1280) of the components may be omitted from the electronic device 1201, or one or more other components may be added in the electronic device 1201. In some embodiments, some of the components may be implemented as single integrated circuitry. For example, the sensor module 1276 (e.g., a fingerprint sensor, an iris sensor, or an illuminance sensor) may be implemented as embedded in the display device 1260 (e.g., a display).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, or a keyboard.

The sound output device 1255 may output sound signals to the outside of the electronic device 1201. The sound output device 1255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to an embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment, the audio module 1270 may obtain the sound via the input device 1250, or output the sound via the sound output device 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector), The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™ wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment, the antenna module 1297 may include one or more antennas, and, therefrom, at least one antenna appropriate for a communication scheme used in the communication network, such as the first network 1298 or the second network 1299, may be selected, for example, by the communication module 1290 (e.g., the wireless communication module 1292). The signal or the power may then be transmitted or received between the communication module 1290 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

Figure 13:
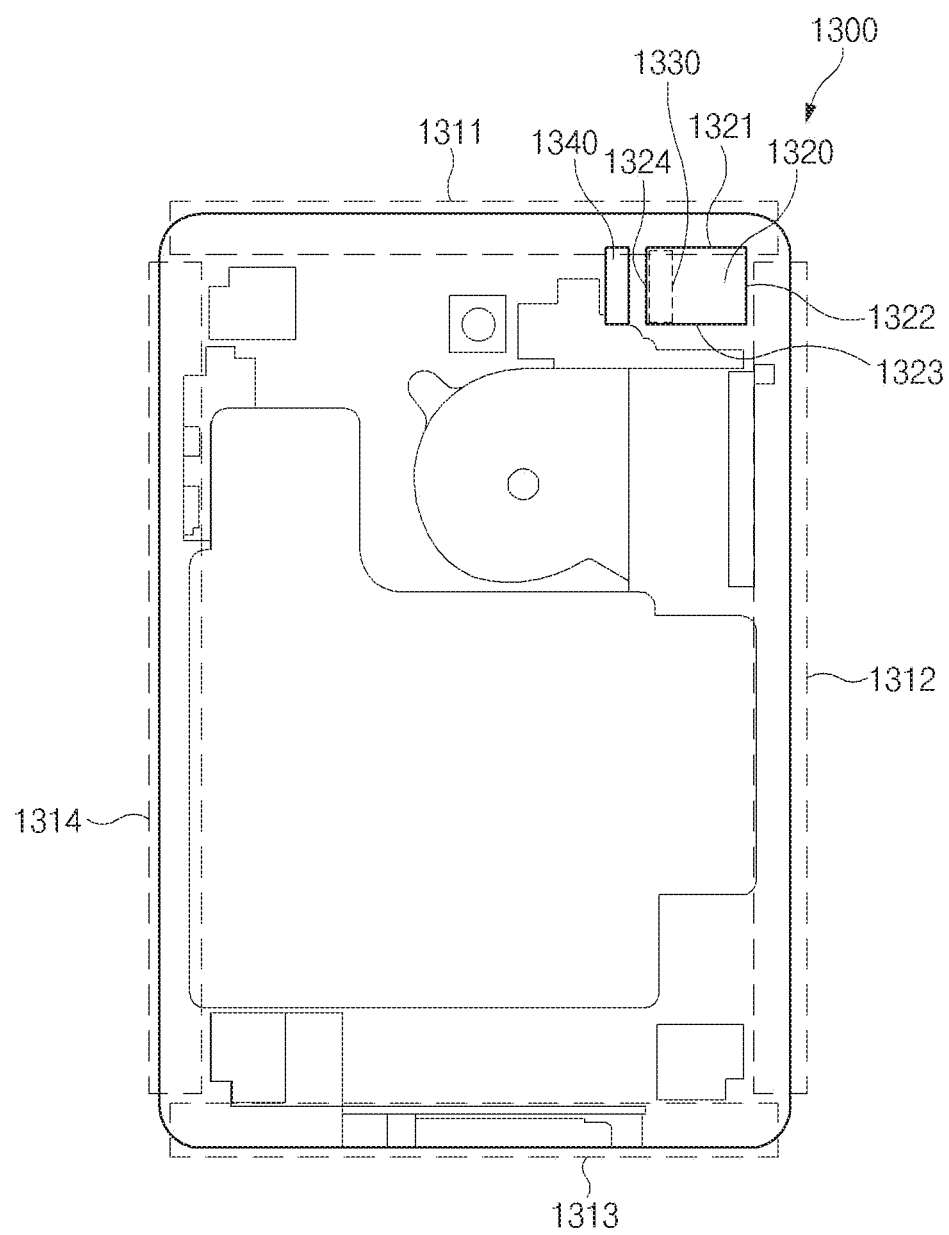
FIG. 13 illustrates an internal rear view of an electronic device, according to an embodiment.

FIG. 13 illustrates an internal rear view of an electronic device, according to an embodiment.

Referring to FIG. 13, an electronic device 1300 may include a housing including a front surface, a back surface opposite to the front surface, and a side member that surrounds a space between the front surface and the back surface, includes a conductive material, and is substantially rectangular when viewed from above the front surface.

According to an embodiment, as illustrated in FIG. 13, the side surface of the housing may include a first portion 1311, a second portion 1312, a third portion 1313, and a fourth portion 1314. The first portion 1311 may mean an area extending in the first direction by a first length. The second portion 1312 may mean an area extending in a second direction perpendicular to the first direction by a second length. In an embodiment, the second length may be longer than the first length. The third portion 1313 may be an area extending in the first direction parallel to the first portion 1311 by the first length. The fourth portion 1314 may be an area extending in the second direction parallel to the second portion 1312 by the second length. According to an embodiment, the first portion 1311, the second portion 1312, the third portion 1313, and the fourth portion 1314 may include conductive materials.

According to an embodiment, the electronic device 1300 may include a substrate 1320 disposed adjacent to at least one corner in a space inside the housing. In an embodiment, the substrate 1320 may be parallel to the back surface and front surface of the housing. According to an embodiment, the substrate 1320 may be in the shape of a rectangular shape or substantially rectangular shape. For example, the substrate 1320 may include a first side 1321, a second side 1322, a third side 1323, and a fourth side 1324.

According to an embodiment, the first side 1321 is a side surface of the substrate 1320 and may be a side surface parallel to the first portion 1311. For example, the first side 1321 may be a side surface adjacent to the first portion 1311 and extending along a part of the first portion 1311. The second side 1322 may be a side surface parallel to the second portion 1312. For example, the second side 1322 may be a side surface adjacent to the second portion 1312 and extending along a part of the second portion 1312. The third side 1323 may be a side surface extending parallel to the first side 1321. The fourth side 1324 may be a side surface extending parallel to the second side 1322.

According to various embodiments, the electronic device 1300 may include an array 1330 of antenna elements protruding from the third side 1323 or the fourth side 1324 of the substrate 1320 toward the inner space of the housing. The array 1330 may be referred to as an "antenna array" 1330. According to various embodiments, the antenna array 1330 may include a plurality of antenna elements.

According to an embodiment, the plurality of antenna elements included in the antenna array 1330 may radiate the millimeter wave signal for communication using a millimeter wave signal. According to an embodiment, the antenna elements may include dipole antennas.

According to an embodiment, the electronic device 1300 may include a conductive plate 1340 disposed adjacent to the antenna array 1330. According to various embodiments, the conductive plate 1340 may be inserted between the third side 1323 of the substrate 1320 and the third portion 1313 or between the fourth side of the substrate 1320 and fourth portion 1314. In an embodiment, the conductive plate 1340 may be directed to face the antenna array 1330.

According to an embodiment, the conductive plate 1340 may include a concave surface facing the antenna array 1330. According to an embodiment, the conductive plate 1340 may reflect the millimeter wave signal radiated from the antenna array 1330 toward the first portion 1311 or the second portion 1312 of the substrate 1320.

According to an embodiment, the electronic device 1300 may include a dielectric (not shown) interposed between the antenna array 1330 and the conductive plate 1340. The dielectric may reduce the distance between the antenna array 1330 and the conductive plate 1340 by shortening the wavelength of the millimeter wave signal.

According to an embodiment, the electronic device 1300 may include a wireless communication circuit (not illustrated). In an embodiment, the wireless communication circuit may be electrically connected to the antenna array 1330 and may be configured to provide wireless communication in a frequency range between 20 GHz and 100 GHz.

According to embodiments disclosed in this specification, it is possible to maintain the communication performance using a signal in the ultra-high frequency band while a design aesthetic sensibility is formed using a metal frame. Besides, unlike conventional solutions, it is possible to save the process cost without damaging the appearance in a limited mounting area.

According to an embodiment, an electronic device may include a housing including a front surface, a back surface opposite to the front surface, and a side surface surrounding a space between the front surface and the back surface and made of a metallic material, at least one antenna array disposed within the housing so as to radiate a millimeter wave signal toward an inside of the electronic device, a wireless communication circuit electrically connected to the at least one antenna array and communicating by using the millimeter wave signal, and a reflecting member arranged such that the millimeter wave signal radiated from the at least one antenna array is reflected toward an outside of the electronic device.

According to an embodiment, the reflecting member may be arranged spaced from the at least one antenna array by ¼ wavelength of the millimeter wave signal in an inner direction of the electronic device.

According to an embodiment, an electronic device may further include a dielectric having permittivity of a specified magnitude. The dielectric may be interposed between the at least one antenna array and the reflecting member.

According to an embodiment, the reflecting member may be arranged spaced from the at least one antenna array in an inner direction of the electronic device by a distance obtained by dividing ¼ wavelength of the millimeter wave signal by a square root of the permittivity of the specified magnitude.

According to an embodiment, the side surface of the housing may include a first side surface and a second side surface opposite to the first side surface. The at least one antenna array may include a first antenna array disposed to radiate the millimeter wave signal toward the inside of the electronic device from the first side surface and a second antenna array disposed to radiate the millimeter wave signal toward the inside of the electronic device from the second side surface. The reflecting member may be interposed between the first antenna array and the second antenna array.

In an embodiment, the reflecting member may include a first reflecting member and a second reflecting member. The first reflecting member may be arranged such that the millimeter wave signal radiated from the first antenna array is reflected toward the first side surface of the electronic device. The second reflecting member may be disposed such that the millimeter wave signal radiated from the second antenna array is reflected toward the second side surface of the electronic device.

In an embodiment, the reflecting member may be implemented with at least one of the included metal bracket, shield can, and PCB.

According to an embodiment, the at least one antenna array may a dipole antenna.

In an embodiment, the electronic device may further include a patch antenna. The patch antenna may radiate the millimeter wave signal toward the front surface or the back surface of the electronic device.

According to an embodiment, the front surface and the back surface of the housing may have at least one shape of a circular shape, an elliptical shape, a rectangular shape, and a rounded rectangular shape.

According to an embodiment, the millimeter wave signal may have a frequency between 10 GHz and 300 GHz.

According to an embodiment, an electronic device may include a housing including a front surface, a back surface opposite to the front surface, and a side surface surrounding a space between the front surface and the back surface and made of a metallic material, at least one antenna array disposed within the housing so as to radiate a millimeter wave signal toward an outside of the electronic device, a wireless communication circuit electrically connected to the at least one antenna array and communicating by using the millimeter wave signal, and a reflecting member. The side surface of the housing may include a first side surface and a second side surface opposite to the first side surface. The millimeter wave signal radiated from the at least one antenna array may be reflected by the first side surface in the direction of the second side surface. The millimeter wave signal reflected from the first side surface in the direction of the second side surface may be reflected back in the direction of the first side surface by the reflecting member.

According to an embodiment, the at least one antenna array may be arranged spaced from the first side surface toward the inside by ¼ wavelength of the millimeter wave signal.

According to an embodiment, the reflecting member may be interposed between the at least one antenna array and the front surface of the housing.

According to an embodiment, an electronic device may further include a dielectric having permittivity of a specified magnitude. The dielectric may be interposed between the at least one antenna array and the first side surface.

According to an embodiment, the inner side of the first side surface may have a parabolic, half-parabolic, or planar shape.

According to an embodiment, an electronic device may include a housing including a front surface, a back surface opposite to the first surface, and a side member surrounding a space between the front surface and the back surface, including a conductive material, and being substantially rectangular shape when viewed from above the front surface, a substrate parallel to the back surface in the space and arranged adjacent to a corner of the space, an array of antenna elements protruding from the third side or the fourth side of the substrate toward the space, a conductive plate inserted between the third side of the substrate and the third portion or between the fourth side of the substrate and the fourth portion and directed to face an array of the antenna elements, and a wireless communication circuit electrically connected to the array of antenna elements and configured to provide wireless communication in a frequency range between 20 GHz and 100 GHz. The side surface of the housing may include a first portion extending in a first direction by a first length, a second portion extending in a second direction perpendicular to the first direction by a second length longer than the first length, a third portion extending in the first direction parallel to the first portion by the first length, and a fourth portion extending in the second direction parallel to the second portion by the second length. The substrate has a rectangular shape including a first side extending along a part of the first portion a second side extending along a part of the second portion a third side extending parallel to the first side, and a fourth side extending parallel to the second side.

According to an embodiment, the antenna elements may include dipole antennas.

According to an embodiment, the conductive plate may include a concave surface facing the array of antenna elements.

According to an embodiment, a dielectric interposed between the conductive plate and the array of the antenna elements may be further included.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a housing including a front surface, a back surface opposite to the front surface, and a side surface surrounding a space between the front surface and the back surface and made of a metallic material;
   at least one antenna array disposed within the housing so as to radiate a millimeter wave signal toward an inside of the electronic device;
   a wireless communication circuit electrically connected to the at least one antenna array and configured to communicate by using the millimeter wave signal;
   a reflecting member arranged such that the millimeter wave signal radiated from the at least one antenna array is reflected toward an outside of the electronic device; and
   a dielectric interposed between the at least one antenna array and the reflecting member,
   wherein a distance between the at least one antenna array and the reflecting member is less than ¼ wavelength of the millimeter wave signal due to the dielectric.

2. The electronic device of claim 1,
   wherein the at least one antenna array is configured to radiate the millimeter wave signal in an inner direction of the electronic device, and
   wherein the reflecting member is disposed in front of the at least antenna array to reflect the millimeter wave in an outer direction of the electronic device.

3. The electronic device of claim 1,
   wherein the distance is set to induce constructive interferences between the millimeter signal radiated from the at least one antenna array and a reflected millimeter signal reflected by the reflecting member.

4. The electronic device of claim 1, wherein the distance is obtained by dividing ¼ wavelength of the millimeter wave signal by a square root of permittivity of a specified magnitude of the dielectric.

5. The electronic device of claim 1,
   wherein the side surface of the housing includes a first side surface and a second side surface opposite to the first side surface,
   wherein the at least one antenna array includes a first antenna array disposed to radiate the millimeter wave signal toward the inside of the electronic device from the first side surface and a second antenna array disposed to radiate the millimeter wave signal toward the inside of the electronic device from the second side surface, and
   wherein the reflecting member is interposed between the first antenna array and the second antenna array.

6. The electronic device of claim 5,
   wherein the reflecting member includes a first reflecting member and a second reflecting member,
   wherein the first reflecting member is arranged such that the millimeter wave signal radiated from the first antenna array is reflected toward the first side surface of the electronic device, and
   wherein the second reflecting member is arranged such that the millimeter wave signal radiated from the second antenna array is reflected toward the second side surface of the electronic device.

7. The electronic device of claim 5, wherein the wireless communication circuit implements multi input multi output (MIMO), using the first antenna array and the second antenna array.

8. The electronic device of claim 5, wherein the wireless communication circuit implements reception diversity, using the first antenna array and the second antenna array.

9. The electronic device of claim 1, wherein the reflecting member has one shape of a parabolic shape, a half-parabolic shape, and a planar shape.

10. The electronic device of claim 1, wherein the reflecting member has an asymmetric shape with respect to the at least one antenna array.

11. The electronic device of claim 1, further comprising:
    at least one of a metal bracket, a shield can, and a printed circuit board (PCB) disposed between a front side and a rear side,
    wherein the reflecting member is implemented with the at least one of the metal bracket, shield can, or PCB.

12. The electronic device of claim 1, wherein the at least one antenna array includes a dipole antenna.

13. The electronic device of claim 12, further comprising:
    a patch antenna,
    wherein the patch antenna radiates the millimeter wave signal toward the front surface or the back surface of the electronic device.

14. The electronic device of claim 1, wherein the front surface and the back surface of the housing have at least one shape of a circular shape, an elliptical shape, a rectangular shape, and a rounded rectangular shape.

15. The electronic device of claim 1, wherein the millimeter wave signal has a frequency between 10 GHz and 300 GHz.

* * * * *